US006961666B2

(12) United States Patent
Comas Romero et al.

(10) Patent No.: US 6,961,666 B2
(45) Date of Patent: Nov. 1, 2005

(54) SYSTEM FOR AUTOMATIC COLLECTION AND TRANSPORT OF READINGS FROM WATER, GAS AND ELECTRICITY METERS

(75) Inventors: Jose Mario Comas Romero, Barcelona (ES); Carles Perello Garcia, Barcelona (ES)

(73) Assignee: Automated Meter Reading Systems, S.L., Barcelona (ES)

( * ) Notice: Subject to any disclaimer, the term of this patent is extended or adjusted under 35 U.S.C. 154(b) by 35 days.

(21) Appl. No.: 10/332,634

(22) PCT Filed: Jun. 21, 2001

(86) PCT No.: PCT/IB01/01142

§ 371 (c)(1),
(2), (4) Date: Jan. 9, 2003

(87) PCT Pub. No.: WO02/08725

PCT Pub. Date: Jan. 31, 2002

(65) Prior Publication Data

US 2004/0039539 A1 Feb. 26, 2004

(30) Foreign Application Priority Data

Jul. 19, 2000 (ES) .......................................... 200001790

(51) Int. Cl.$^7$ ............................................. G06F 19/00
(52) U.S. Cl. ......................... 702/62; 702/65; 702/104; 702/176; 702/188; 340/853.1; 379/15.02; 709/217; 375/130
(58) Field of Search ............................. 702/45, 62, 65, 702/104, 156, 176, 188–189; 340/853.1; 379/15.02; 709/217; 375/130

(56) References Cited

U.S. PATENT DOCUMENTS

| 5,963,650 | A | * | 10/1999 | Simionescu et al. | .......... 705/63 |
| 6,069,571 | A | | 5/2000 | Tell | ...................... 340/870.02 |
| 6,078,785 | A | * | 6/2000 | Bush | ............................. 455/7 |
| 6,199,068 | B1 | * | 3/2001 | Carpenter | ................... 707/100 |
| 6,246,677 | B1 | * | 6/2001 | Nap et al. | ................... 370/346 |
| 6,333,975 | B1 | * | 12/2001 | Brunn et al. | ........... 379/106.03 |
| 6,366,217 | B1 | * | 4/2002 | Cunningham et al. | . 340/870.31 |
| 6,538,577 | B1 | * | 3/2003 | Ehrke et al. | ........... 340/870.02 |
| 6,710,721 | B1 | * | 3/2004 | Holowick | .............. 340/870.02 |

OTHER PUBLICATIONS

Billington, 'Main Signaling– Progress of a U.K. Remote Meter Reading and Load Management System', Dec. 1990, IEEE Article, pp. 158–162.*

Erakovic et al., 'A System for Remote Meter Reading and Load Management', Dec. 1999, IEEE Article, pp. 196–199.*

Dostert, 'Frequency–Hopping Spread–Spectrum Modulation for Digital Communications Over Electrical Power Lines', Dec. 1990, IEEE Article, pp. 700–710.*

Xiuqing et al., 'Design and Implementation of County Government Decision Support Information Network System', Oct. 1997, IEEE Article, pp. 1640–1644.*

Pomalaza–Raez et al., 'A Routing Algorithm For Multihop Packet Radio Networks with Uni and Bi Directional Links', Dec. 1993, IEEE Article, pp. 300–303.*

* cited by examiner

*Primary Examiner*—Marc S. Hoff
*Assistant Examiner*—Elias Desta
(74) *Attorney, Agent, or Firm*—Steinberg & Raskin, P.C.

(57) ABSTRACT

A system for automatic collection and transport of readings from water, gas and electricity meters wherein at least one receiver element and one element to transmit (1) define an ad-hoc wireless network, self organizing in an area (A), where the readings are transmitted to the next element using multihop techniques according to a routing algorithm. A value t is assigned to the receiver elements (1), with maximum value T. If the direct neighbours of a given network node have as a maximum an assigned value t, a value t-k is assigned to this node. Every node will transmit a message to a node with t value larger than its own. If there is more than one with the same maximum value, it will transmit to one of them. The system allows the meter reading to be transported automatically to the billing center.

14 Claims, 1 Drawing Sheet

SYSTEM FOR AUTOMATIC COLLECTION AND TRANSPORT OF READINGS FROM WATER, GAS AND ELECTRICITY METERS

The present invention relates to a system for automatic collection and transport of readings from water, gas and electricity meters, based on spread-spectrum digital RF communications and Internet protocols. The system allows the meter reading to be transported automatically to the billing centre.

BACKGROUND OF THE INVENTION

Known in the art are systems for taking readings of water, gas and electricity meters, which are based on manual reading of the meters. The usual method involves sending an operative to the building to be invoiced, in order to read and note down the figures of the reading.

This method involves a number of disadvantages which are described below.

The fact of having to go to the building in order to take the reading often means having to gain access to private premises or premises to which it is difficult to gain access. In the case of remote zones, the travel costs of the operative have to be added, and these can be estimated approximately, for Spain, at between 30 and 160 pesetas per reading. To all these disadvantages must be added also the possibility of human error by the operative in taking the reading, together with possible error by the personnel processing the information obtained by the operative.

New electronic reading systems are now being introduced to allow the operative to take the meter readings using a portable computer or the like. Although this system reduces considerably the potential reading error by the operative, it does not solve the problems of cost associated with the reading, nor does it permit the frequency of readings to be increased. With the intention of reducing costs, the utilities that take the readings from the meters make estimated readings of consumption, that is, they do not take the reading at the residence of the customer but instead determine approximately the reading of the meter, which is unfair for the customer because later, normally at the end of each year, the payment has to be regularised.

Current systems presently use electronic telemetry emitter systems to send the reading from the meter. The system requires that an operative use a hand-held receiver to "read" the figures transmitted by the meter, which means that the receiver must be within the coverage range of the transmitter. Although the system does solve some of the disadvantages that have existed so far in relation to the classic manual reading, it still presents several limitations:

The reading costs are not reduced greatly, since operatives are still needed to travel and take the reading.

The telemetry systems use narrow-band transmission that can easily suffer interference, and transmission power in the range of tens of watts is required. The system causes 'band pollution' with radio-electric noise and hinders mass deployment thereof in densely populated areas.

The system works in one direction only, and so cannot carry out other value-added applications. Document US-A-6069571 discloses a meter data collection device using a RF transceiver, where each meter interface unit (MUI) is connected directly to one base station (BS) over a control channel of a wireless cellular system (AMPS). The system is limited by:

Relies on an already installed communication infrastructure.

Telephone companies charge for data delivered.

Changes in the wireless cellular network technology implies the replacement of the full system because each meter unit interfaces uses a channel of the wireless cellular network (High replacement cost).

High infrastructure cost per meter, because expensive devices (Base Stations, Switch matrix, . . . ) are required to interface with the wireless cellular network.

Base station (BS) coverage limits strongly the number of meters connected, because each MUI should be connected directly to one BS, using just one hop.

Energy consumption is not optimized.

Short battery life, increases the operating cost.

DESCRIPTION OF THE INVENTION

The device of the invention overcomes the aforesaid disadvantages, while providing other advantages which will be described below.

The system for automatic collection and transport of readings from water, gas and electricity meters is characterized in that the at least one receiver element and one element to transmit (1) define an ad-hoc wireless network, self organizing in an area (A), where the readings are transmitted to the next element using multihop techniques according to a routing algorithm:

A value t is assigned to the receiver elements, with maximum value T.

If the direct neighbours of a given network node have as a maximum an assigned value t, a value t-k is assigned to this node, where k>0.

Every node will transmit a message to a neighbouring node with t value larger than its own. If there is more than one with the same maximum value, it will transmit to one of them.

A system is thereby achieved for automatic collection and transport of readings from water, gas and electricity meters without need for any operative travel, since the reading from the meter is transmitted via radio to the receiver.

Advantageously, the interface subsystem includes an electronic interface capable of adapting the signal pulses sent from a current loop or optical sensor.

This adaptation of the pulses permits correct processing thereof by the microcontroller subsystem.

Also advantageously, the radio transmitter subsystem uses a spread-spectrum digital transceiver capable of implementing a Frequency Hopping or Direct Sequence scheme.

Preferably, the radio transmission subsystem is of low power, such as less than 1 W, with a maximum coverage in urban areas of 300 meters.

Since the power is low, this prevents potential interference in the transmission band with radio-electric noise, and thus permits massive deployment in densely populated areas.

According to one characteristic of the invention, the microcontroller subsystem executes the software application on a multi-tasking operating system.

Preferably, the transmission subsystem sends the meter readings to at least one receiver element, via spread-spectrum digital radio and channel sense multiple access method with collision avoidance (CSMA/CA).

The use of spread spectrum considerably reduces the danger of possible interference.

The communication between at least one receiver element and the radio transmission subsystem is bidirectional.

The system is thus capable of sending and receiving information, which means that value-added applications can be implemented.

According to another characteristic of the invention, the communication between the at least one receiver element and the radio transmission subsystem uses the IP protocol.

Moreover, the software application includes a first two-dimensional table, in which the first dimension is the tariff to be applied and the second dimension is the identification of the meter read, and a second two-dimensional table of tariffs in which the first dimension is the start time and the second dimension is the stop time.

The meters can be substituted by any kind of sensor or data acquisition equipment.

BRIEF DESCRIPTION OF THE DRAWINGS

For a better understanding of all that has been outlined, some drawings are attached which, schematically and solely by way of non-restrictive example, show a practical case of embodiment.

DESCRIPTION OF A PREFERRED EMBODIMENT OF THE INVENTION

An example of the system of the invention is described in the following, by means of which the reading of 1 to 50 meters is carried out, the values of the various readings are stored and are sent to neighbouring equipment 1 which lies within the area of coverage. The deployment of the pieces of equipment in an area A constitutes the network of FIG. 1, in which each of the pieces of equipment 1 is able to route the packets of information to one of the pieces of equipment 1, which is called access point.

Figure 1:
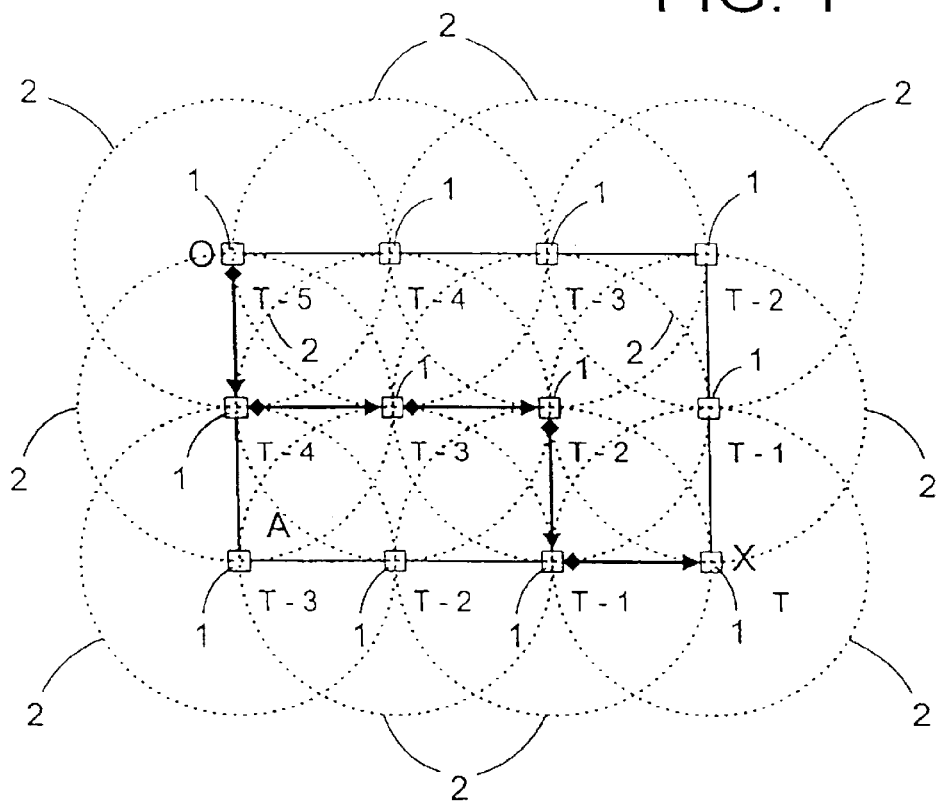
FIG. 1 shows schematically a digital radio network using FHSS or DSSS by means of an access method to the means based on CSMA/CA deployed in a particular area, by means of which readings of the meters are taken automatically.

As FIG. 1 shows, the network is deployed in area A. Each circle 2 represents the area of coverage centred upon a system. The area of coverage of a system covers at least one other piece of equipment 1. The bidirectional arrows represent the path travelled by an information packet from a point of origin O to an access point X.

Figure 2:
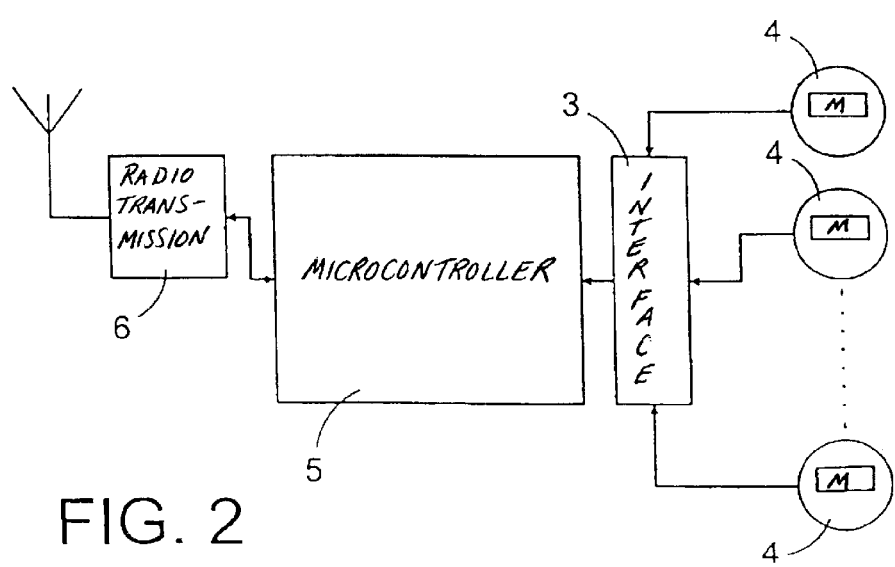
FIG. 2 shows a block diagram of the electronic system for automatic collection and transport of readings from water, gas and electricity meters, based on digital radio network with IP protocols, according to the invention.

As FIG. 2 shows, the system for automatic collection and transport of readings from water, gas and electricity meters includes an interface subsystem 3 with the meters (M) 4, a microcontroller subsystem 5 and a radio transmission subsystem 6.

The subsystem 1 includes an electronic interface to the water, gas or electricity meters 4, capable of adapting pulses originating from a current loop or optical sensor, for their processing by a microcontroller subsystem 5.

The microcontroller subsystem 5 is the core of the system and runs a software application on a multi-task operating system. The software application processes the pulses generated by the meters 4, maintains the values of the various readings and prepares the sending of the readings through the radio transmission subsystem 6.

The radio transmission subsystem 6 includes a digital spread-spectrum transceiver capable of implementing either frequency hopping (FHSS) or direct sequence (DSSS) schemes with digital modulation (i.e., the GFSK, 2GFSK or 4GFSK). The media access protocol (IEEE 802.11 or SWAP-CA) is based on a standard that implements collision sense multiple access with collision avoidance (CSMA/CA).

The radio transmission subsystem 6 is of low power, less than 1 W, such as between 0.01 W to 1 W; and has a maximum coverage range of 300 meters in radius within urban areas of a circle.

The radio transmission is bidirectional, such that the system is capable of sending and receiving information. The transmission/reception operating mode is managed by the software application mentioned above. The application is also responsible for forming and sending the packets of information according to different network protocols, such as the IP protocol.

Therefore, according to the configuration described, the system works as follows.

When a meter 4 generates a pulse, the interface subsystem 3 generates an interrupt signal to the microcontroller subsystem 5. The application handles the interrupt and stores the new reading for that meter 4, either as a relative value (increase over the last confirmed dispatch) or an absolute value (total reading since setting into operation of the system).

The software application maintains a two-dimensional table of readings, in which the first dimension is the tariff to be applied and the second dimension is the identification of the counter 4 read. The application also maintains a table of tariffs with two ranges: the start time and the stop time.

The software application then sends the readings to a neighbouring device 1, according to a routing algorithm:

A value t is assigned to the network access points, with maximum value T.

If the direct neighbours of a given network node have as a maximum an assigned value t, a value t-k is assigned to this node, in which k is an entire number calculated on the basis of neighbourhood link quality.

Each node will transmit a message to a node with a t value larger than its own. If there are more than one with the same maximum value, it will transmit to one of them randomly selected, in order to distribute the packets uniformly and avoid traffic congestion.

The readings are transmitted as a result of either an external query or a preset sending frequency. The software application may leave pending a confirmation of the sent readings.

The receiver equipment may or may not confirm reception. If it is not itself the data destination it must route the received packet to the final target destination. The application maintains the routing tables to route data packets optimally.

Although reference has been made to one specific embodiment of the invention, it will be obvious to an expert in the subject that the system described lends itself to many variations and modifications, and that all the details mentioned may be replaced by others that are technically equivalent, without departing from the scope of protection defined in the attached claims.

What is claimed is:

1. A system for automatic collection and transport of readings from water, gas and electricity meters (4) comprising:

at least one element to transmit the reading from the meter and at least one receiver element (1) of that reading, said at least one transmitter device including an interface subsystem (3) that adapts the signal from the meter (4) to be processed by a microcontroller subsystem (5), which executes software application and prepares the meter (4) reading to be sent from an RF transmitter subsystem (6) to at least one receiver element (1), wherein said at least one receiver element and one element to transmit (1) define an ad-hoc wireless network, self organizing in an area (A), where said readings are transmitted to the next element using multihop techniques according to a routing algorithm:
  a value t is assigned to the receiver elements (1), with maximum value T;
  if the direct neighbours of a given network node have as a maximum an assigned value t, a value t-k is assigned to this node; and
  every node will transmit a message to a node with t value larger than its own, if there is more than one with the same maximum value, it will transmit to one of them; and
wherein the interface subsystem (3) includes an electronic interface capable of adapting signal pulses sent from a current loop or optical sensor.

2. System according to claim 1, wherein the radio transmitter subsystem (6) uses a spread-spectrum digital transceiver capable of implementing a Frequency Hopping or Direct Sequence scheme, with digital modulation.

3. System according to claim 1, wherein the radio transmission subsystem (6) is of low power, such as between 0.01 W and 1 W, with a maximum coverage in urban areas of a circle of 300 meters in radius.

4. System according to claim 1, wherein the microcontroller subsystem (5) executes the software application on a multi-tasking operating system.

5. System according to claim 1, wherein the transmission subsystem (6) sends the meter (4) readings to at least one receiver element (1), via spread-spectrum digital radio using channel sense multiple access method with collision avoidance (CSMA/CA).

6. System according to claim 1, wherein the communication between the at least one receiver element (1) and the radio transmission subsystem (6) is bidirectional.

7. System according to claim 1, wherein the communication between said at least one receiver element (1) and the radio transmission subsystem (6) uses the IP protocol.

8. System according to claim 1, wherein the application includes a first two-dimensional table, in which the first dimension is the tariff to be applied and the second dimension is the identification of the meter (4) read, and a second two-dimensional table of tariffs in which the first dimension is the start time and the second dimension is the stop time.

9. System according to claim 1, wherein the meters can be substituted by any kind of sensor or data acquisition equipment.

10. A system for automatic collection and transport of readings from water, gas and electricity meters (4) comprising:
  at least one element to transmit the reading from the meter and at least one receiver element (1) of that reading, said at least one transmitter device including an interface subsystem (3) that adapts the signal from the meter (4) to be processed by a microcontroller subsystem (5), which executes software application and prepares the meter (4) reading to be sent from an RF transmitter subsystem (6) to at least one receiver element (1),
  wherein said at least one receiver element and one element to transmit (1) define an ad-hoc wireless network, self organizing in an area (A), where said readings are transmitted to the next element using multihop techniques according to a routing algorithm:
    a value t is assigned to the receiver elements (1), with maximum value T;
    if the direct neighbours of a given network node have as a maximum an assigned value t, a value t-k is assigned to this node; and
    every node will transmit a message to a node with t value larger than its own, if there is more than one with the same maximum value, it will transmit to one of them; and
  wherein the radio transmission subsystem (6) is of low power, such as between 0.01 W and 1 W, with a maximum coverage in urban areas of a circle of 300 meters in radius.

11. System according to claim 10, wherein the transmission subsystem (6) sends the meter (4) readings to at least one receiver element (1), via spread-spectrum digital radio using channel sense multiple access method with collision avoidance (CSMA/CA).

12. System according to claim 10, wherein the communication between said at least one receiver element (1) and the radio transmission subsystem (6) uses the IP protocol.

13. A system for automatic collection and transport of readings from water, gas and electricity meters (4) comprising:
  at least one element to transmit the reading from the meter and at least one receiver element (1) of that reading, said at least one transmitter device including an interface subsystem (3) that adapts the signal from the meter (4) to be processed by a microcontroller subsystem (5), which executes software application and prepares the meter (4) reading to be sent from an RF transmitter subsystem (6) to at least one receiver element (1),
  wherein said at least one receiver element and one element to transmit (1) define an ad-hoc wireless network, self organizing in an area (A), where said readings are transmitted to the next element using multihop techniques according to a routing algorithm:
    a value t is assigned to the receiver elements (1), with maximum value T;
    if the direct neighbours of a given network node have as a maximum an assigned value t, a value t-k is assigned to this node; and
    every node will transmit a message to a node with t value larger than its own, if there is more than one with the same maximum value, it will transmit to one of them; and
  wherein the application includes a first two-dimensional table, in which the first dimension is the tariff to be applied and the second dimension is the identification of the meter (4) read, and a second two-dimensional table of tariffs in which the first dimension is the start time and the second dimension is the stop time.

14. System according to claim 13, wherein the meters can be substituted by any kind of sensor or data acquisition equipment.

* * * * *